United States Patent Office 3,351,601
Patented Nov. 7, 1967

3,351,601
CHLORINATED WAX, VINYL CHLORIDE/VINYL ACETATE BLEND COATED WITH LIMESTONE OR TALC AND PROCESS FOR PREPARING IT
Aurel Blaga, Syracuse, and Michael J. Skrypa, Camillus, N.Y., assignors to Allied Chemical Corporation, New York, N.Y., a corporation of New York
No Drawing. Filed May 13, 1963, Ser. No. 280,072
8 Claims. (Cl. 260—28.5)

This invention relates to a method for coating pellets of a normally sticky thermoplastic binder material comprising a mixture of a minor proportion of a vinyl chloride/vinyl acetate copolymer and a major proportion of a chlorinated paraffin wax with powdered limestone or talc powder, and to the coated binder.

It is known to prepare binder compositions adapted to be compounded with fillers, pigments and other additives for the production of flooring compositions comprising homogeneous blends of a major proportion of a chlorinated paraffin wax of chlorine content of 45% or higher and a minor proportion of a vinyl chloride/vinyl acetate copolymer. The compositions of U.S. Patent 3,005,791 are illustrative.

In the fabrication of flooring compositions such as floor tiles, the binder compositions are customarily pre-blended and furnished to the manufacturer in particulate or pelleted form for ease in handling and compounding. It has been found that although the composite chlorinated paraffin wax-vinyl chloride/vinyl acetate copolymer binder as hereinafter described, can readily be pelleted according to known pelletizing procedures, as by extruding rods or strings followed by cutting the strings into short lengths, nevertheless, the resulting pellets are sticky and tend to adhere to each other on storage even for short periods at ambient temperatures, and to substantially fuse when allowed to stand under mild pressures, such as exerted by the self weight of the pellets, at only moderately elevated temperatures. This tendency of the pellets to fuse is an advantageous property of the chlorinated paraffin-vinyl copolymer binder in compounding floor coverings, as it provides high wetting power for low-priced fillers and pigments, thus permitting the binder to absorb and incorporate into its mass, large quantities of such fillers.

It is known to coat tacky, particulate materials with inorganic dusts to prevent adherence of the sticky particles. However, the unusually high wetting power of the chlorinated paraffin wax-vinyl copolymer binder tends to cause inorganic dusts applied thereto, to diffuse into the body of the binder rather than to remain on the surface of the pellets where they can prevent adherence of the pellets to each other.

We have now found, that particles or pellets of chlorinated paraffin wax-vinyl chloride/vinyl acetate copolymer blends as defined, can be rendered non-adherent and free flowing, if limestone or talc dusts having particle size no larger than about 10 microns are brought into contact with the pellets while the pellets are at a temperature between about 30° C. and about 40° C. If the pellets are at a higher temperature, the dust particles will tend to penetrate and diffuse into the binder to be enveloped by the binder and hence will not serve to render the particles non-adherent. If the particles are at a lower temperature that than specified, the pellets will fail to adhere to a sufficient quantity of the dust to render them no-adherent to each other.

In carrying out the process of our invention, chlorinated paraffin wax which may be stabilized by any of the conventional stabilizers, is heated to 60°–75° C. and is charged to a vessel equipped with agitation means. The chlorinated paraffin wax is then further heated, for example, to 148°–150° C., then the desired quantity of vinyl chloride/vinyl acetate copolymer is added to the molten wax, preferably in finely powdered form, over a period of, say 10–20 minutes with agitation. After completition of addition of the copolymer, the mixture is agitated for an additional short period to thoroughly blend the components. The batch is then allowed to cool to about 100–110° C. and the viscous mass is pelleted, as by extrusion through a perforated die plate, and cutting the extruded strings into pellets of convenient size, for example, between about 0.5 inch and about 1 inch long by about ⅛ inch diameter.

The pellets, which have now been further reduced in temperature, are transferred to the coating chamber, which suitably may be a rotating drum tumbler. With the pellets at a temperature between about 30° C. and about 40° C. finely divided limestone or talc powder is added to the tumbler, and the system is thoroughly mixed, as by rotation of the tumbler, until the surfaces of the pellets are uniformly coated with powder. Usually a rotation time of about 5 to about 15 minutes is sufficient. The batch is then freed of excess powder as by treatment on a shaking sieve.

The binder composition which is treated according to our process is a homogeneous mixture of between about 70% and about 85% of a chlorinated soft paraffin wax containing between about 45% and about 80% of chlorine, preferably between about 45% and about 60% chlorine, with between about 15% and about 30% of a vinyl chloride/vinyl acetate copolymer containing between about 80% and about 95% vinyl chloride, the balance vinyl acetate. This blend is glassy in appearance, has a softening point between about 80° C. and about 90° C. and becomes fluid at temperatures above about 110° C.

Particularly suitable are those chlorinated paraffin waxes obtained by chlorinating the so-called "soft" paraffin waxes, i.e. paraffin waxes having softening points between about 15° C. and about 60° C. These "soft waxes" include mixtures of paraffin waxes and paraffin oils of similar molecular weight. Thus, they include "slack wax" as well as the so-called "soft waxes" or mixtures of slack wax and hydrocarbon oil. "Slack wax" is a crude form of paraffin wax and is the product directly obtained by filtration (dewaxing) of a chilled crude lube oil fraction. "Soft wax" is usually the byproduct obtained in a solvent deoiling process which involves treating slack wax with a warm solvent, for example, methylethyl ketone-toluene mixtures, chilling the resultant system to 50° F. and filtering off the insoluble (high melting) paraffin wax. The filtrate, after being stripped of solvent, constitutes soft wax. This "soft wax" is similar in character to slack wax and is a wax-oil mixture with an oil content of about 35% to about 40%. Mixtures containing up to about 60% oil are suitable.

The finely divided limestone or talc used to coat the particulate binder should have a particle size of not more than about 10 microns. Larger particles fail to adhere sufficiently tenaciously to provide a coating which will render the individual particles non-adherent. Particles should preferably have diameters between about one and about five microns.

The temperature of the pellets during coating is important and should be at least about 30° C., preferably between about 30° C. and about 40° C. At lower temperatures the powder fails to attach itself tenaciously to the pellets. At higher temperatures, the powder tends to penetrate into the interior of the pellet so that its non-tackifying effect is lost or reduced. When the pellets are prepared by extrusion and cutting as described above, they will usually be at a suitable temperature for coating by the time they emerge from the extruder, and will remain sufficiently receptive to coating for a period of about 2 hours at normal atmospheric temperatures. Usually we prefer to carry out the coating process immediately after the binder is pelleted, preferably within about ½ to about 2 hours after completion of the pelleting operation.

The size and shape of the particles or pellets coated is not critical. Usually pellets will have dimensions of the order of ⅛" diameter by ½ to 1 inch long, but larger or smaller pellets may be coated if desired. If the particles are too small, so as to be substantially pulverulent, the danger of the particles fusing on storage is greater than for the pelleted material.

For pellets of a size of the order of ⅛" diameter by 0.5 inch to one inch long, we have found that at least about 0.5% by weight of powder based on the weight of the binder compound should be attached to the pellets to give adequate prevention of adhesion, preferably between about 1% and about 5% by weight.

The following specific examples further illustrate our invention. Parts are by weight except as otherwise noted.

Example 1

A 100 part charge of pellets ⅛" diameter by ½" long prepared by extruding a blend of 75 parts of a chlorinated soft paraffin wax of 52% chlorine content with 25 parts of an 85:15 vinyl chloride/vinyl acetate copolymer, the pellets having a temperature of 35° C. is placed in a rotating tumbler and 5 parts of limestone powder (about 2 microns) are added thereto. The tumbler is rotated for about 15 minutes, then the batch is dumped onto a shaking sieve wherein non-adhering powder is removed. The batch is then weighed and found to have taken up about 2% its weight of limestone powder. Samples of the coated pellets are tested for sticking on storage and handling in comparison with uncoated pellets by three tests;

(1) Six-ounce bottles are filled with pellets and are allowed to stand for ½ hour at 20–25° C.
(2) Eight-ounce bottles are filled with pellets and allowed to stand for three months at 20–25° C.
(3) Pellets are placed in crystallizing dishes and subjected to pressure of 0.55 p.s.i. at 45–50° C. for 15 days. The pressure of 0.55 p.s.i. is estimated to be equal to that exerted at the bottom of a 3-foot high drum loaded with these pellets.

Results of the tests are shown in Table I below.

TABLE I

| Example No. | Treatment | Condition after Storage | | |
|---|---|---|---|---|
| | | One-half hour at 20–25° C. atmospheric pressure | 3 months at 20–25° C. and atmospheric pressure | 15 days at 40–50° C. and 0.55 p.s.i. |
| 1 | Uncoated | Pellets adhere strongly | Pellets fuse | Pellets adhere strongly |
| 2 | Coated | Pellets do not adhere | Pellets do not stick or adhere | Pellets do not adhere. |

It will be noted that coated pellets do not stick to each other on storage at ambient temperatures over long periods of time. Further, they remain free flowing under slight pressures even at elevated temperatures for substantial periods.

Similar results are obtained when talc of about 2 microns is used instead of powdered limestone to coat the pellets.

Example 2

Seven hundred fifty pounds of a stabilized chlorinated paraffin wax of 52% chlorine content, softening point 38°–42° C. at a temperature of 60–75° C. is charged into a glass lined vessel equipped with a glass coated agitator. The chlorinated paraffin wax is heated to 148–150° C. and then 250 pounds of finely powdered vinyl chloride/vinyl acetate copolymer (85% vinyl chloride: 15% vinyl acetate by weight) is added to the molten chlorinated paraffin over a period of 15 minutes with stirring. The batch is stirred for an additional 10 minutes, then is allowed to cool to about 100–110° C. The viscous melt is then transferred to an extrusion unit where it is forced through a die plate provided with ⅛ inch diameter holes. The cylindrically shaped strings of extruded binder are cut into 1 inch long pellets as by a knife moving across the discharge face of the die. The pellets, thus further cooled to about 40° C., are then transferred to a rotating tumbler and finely divided limestone or talc powder of a fineness of about 2 microns is added in an amount between about 1% and about 5% the weight of the pellets. The tumbler is rotated for about 5–15 minutes whereupon the pellets are uniformly coated. The batch is then transferred to a shaking sieve with ¹⁄₁₆-inch openings wherein the excess powder is separated. The powder which adheres to the pellets amounts to about 1%–2% by weight. The resulting coated pellets are non-adherent, and do not stick to each other on handling or storage at ambient temperatures over a long period of time, i.e. several months. Further, they remain free flowing when stored in 3 foot high drums packed with the coated pellets.

While the above describes the preferred embodiments of our invention, it will be understood that departures may be made therefrom within the scope of the specification and claims.

We claim:

1. A free flowing, particulate binder material comprising a normally sticky homogeneous blend of between about 70% and about 85% of a chlorinated soft paraffin wax containing at least about 45% chlorine and between about 15% and about 30% of a vinyl chloride/vinyl acetate copolymer of between about 80% and about 95% vinyl chloride, the balance vinyl acetate, said binder material particles having thereon a surface coating of an inorganic dust selected from the group consisting of limestone and talc of particle size not greater than about 2 microns, said coating being present in an amount equal to at least about 0.5% by weight of the binder material.

2. The composition according to claim 1 wherein the inorganic dust is powdered limestone.

3. The composition according to claim 1 wherein the inorganic dust is talc.

4. The composition according to claim 1 wherein the chlorinated paraffin wax has a chlorine content between about 45% and about 60%.

5. A process for rendering non-adherent and free flowing a normally sticky, particulate mass of a binder material comprising a homogeneous blend of between about 70% and about 85% of a chlorinated soft paraffin wax containing at least about 45% chlorine and between about 15% and about 30% of a vinyl chloride/vinyl acetate copolymer containing between about 80% and about 95% vinyl chloride, the balance vinyl acetate, which comprises applying to said particulate binder at temperatures between about 30° C. and about 40° C. a coating of an inorganic dust selected from the group consisting of limestone powder and talc powder of particle size no greater than about 10 microns in an amount equal to at least about 0.5% by weight of the binder material.

6. The process according to claim 5 wherein the inorganic dust is powdered limestone.

7. The process according to claim 5 wherein the inorganic dust is powdered talc.

8. The process according to claim 5 where the chlorinated paraffin wax has a chlorine content between about 45% and about 60%.

References Cited

UNITED STATES PATENTS

| | | | |
|---|---|---|---|
| 3,005,791 | 10/1961 | Church | 260—27 |
| 3,012,900 | 12/1961 | Kleinmann et al. | 117—4 |

MORRIS LIEBMAN, *Primary Examiner.*

J. A. GAZEWOOD, H. S. KAPLAN,
*Assistant Examiners.*